July 6, 1965　　　　D. O. NASH ETAL　　　3,192,712
LOAD BALANCING ARRANGEMENT FOR ANNULAR
VARIABLE AREA JET EXHAUST NOZZLE
Filed Dec. 31, 1962　　　　　　　　　　2 Sheets-Sheet 2

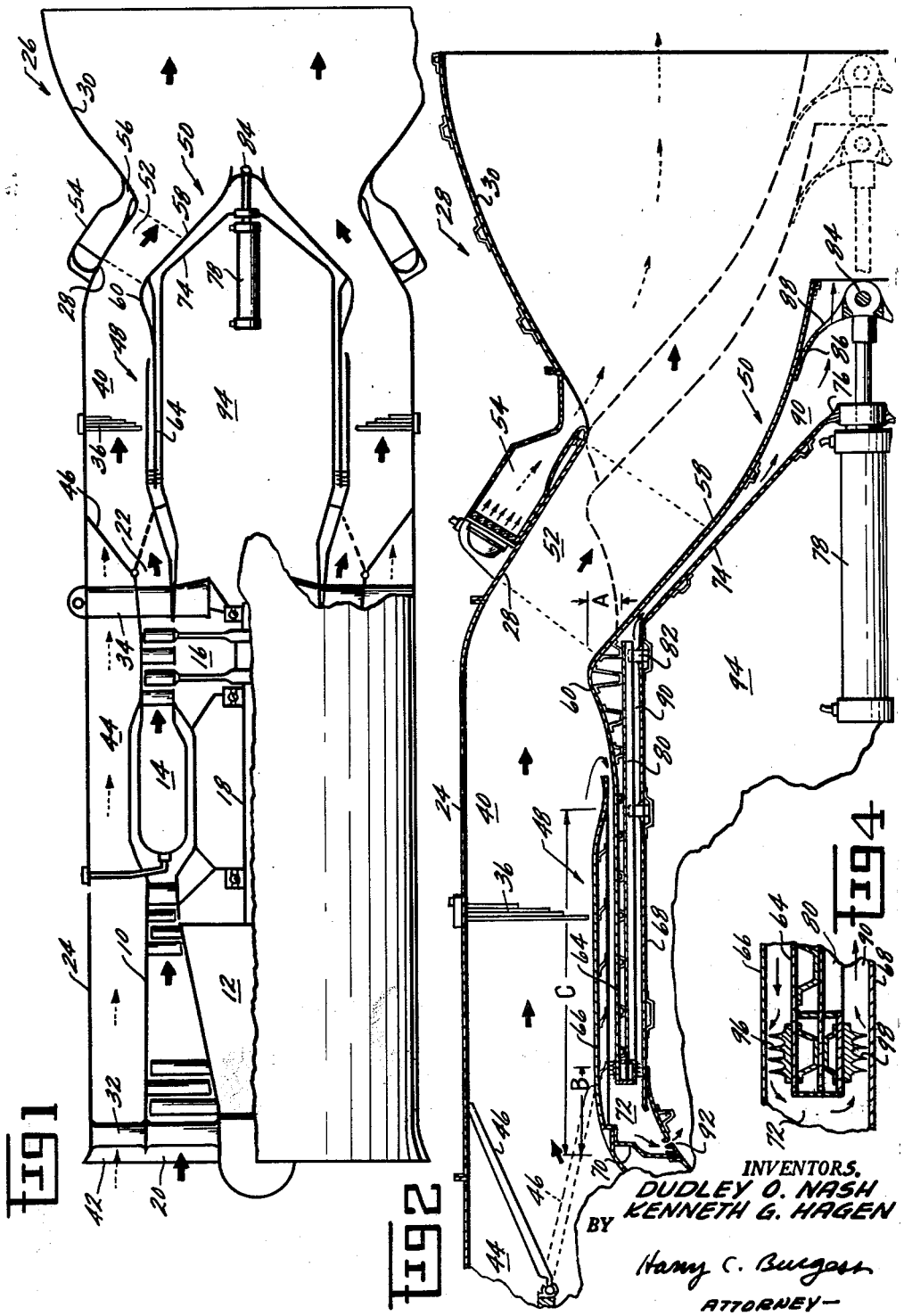

INVENTORS.
DUDLEY O. NASH
KENNETH G. HAGEN
BY
Harry C. Burger
ATTORNEY

United States Patent Office 3,192,712
Patented July 6, 1965

3,192,712
LOAD BALANCING ARRANGEMENT FOR ANNULAR VARIABLE AREA JET EXHAUST NOZZLE
Dudley Owen Nash, Cincinnati, Ohio, and Kenneth Glyn Hagen, Paoli, Pa., assignors to General Electric Company, a corporation of New York
Filed Dec. 31, 1962, Ser. No. 248,480
5 Claims. (Cl. 60—35.6)

This invention relates generally to an annular exhaust nozzle in a jet propulsion powerplant and, more specifically, to a load balancing arrangement for an annular plug nozzle member movable so as to vary the exhaust annulus of a combination jet propulsion powerplant.

Recently the airlines, and other aircraft operators, have been emphasizing the need for aircraft capable of performing over a very wide range of flight speeds and under a variety of operating conditions. For example, it has been urged that aircraft be designed which will be capable of supersonic cruise at speeds of Mach 3.0, or above, from city to city (or target to target) and which will also be able to loiter above an airfield for a significant period of time before landing. Such a wide range of operating conditions poses a particularly severe problems for the designers of advanced aircraft powerplants. More and more engine designers are turning to powerplants which combine the more desirable features of the turbojet, turbofan and ramjet engines. In addition, either or all of the aforementioned engines in combination with rocket motors has been seriously considered. Very important to the success of any jet engine design is the configuration of the nozzle through which the exhaust gases efflux to provide the thrust to propel the vehicle. As pointed out in the patent to Alford, 3,068,645, assigned to the assignee of the present application, some jet exhaust nozzle configurations are better suited to operation under certain conditions than others. Thus, a convergent-divergent, variable area nozzle is considered highly desirable for use in an aircraft adapted to operate over a wide range of subsonic and supersonic speeds. One version of such a nozzle appears in the patent of common assignment to Schaefer, 2,969,641. This patented device comprises a variable flap or finger type of convergent-divergent nozzle. Another type is the annular convergent-divergent nozzle wherein an inner annular member, commonly known as the "plug," is adapted for movement axially with respect to an outer wall or jet exhaust duct to vary the nozzle throat area.

Plug-type annular nozzles have not been favored for use with advanced combination type power plants, however, for a number of reasons. One of the more severe problems involves cooling of the inner plug member particularly when the engine utilizes some sort of thrust augmentation means, such as an afterburner. Another problem of considerable import involves the requirement for large actuation forces necessary to move the plug in opposition to the high pressures imposed on the plug member surfaces by the exhaust gas stream. These pressures vary from a maximum under thrust augmentation or afterburning operation to a minimum under straight turbojet operation.

Accordingly, a general object of the present invention is an improved annular convergent-divergent variable area plug nozzle for use with an advanced powerplant having thrust augmentation means.

A more specific object of the present invention is to provide a load balancing arrangement for the inner plug member of an annular jet exhaust nozzle of a combination engine having thrust augmentation means whereby in the nozzle area as varied by axially translating the plug member.

Briefly stated, one embodiment of our invention comprises an annular jet exhaust nozzle for a combination turbo-rocket-ramjet engine having thrust augmentation means, the nozzle including annular supporting means co-axially fixed with respect to the engine exhaust duct and forming a chamber therewith, and an inner plug member, the plug member having an upstream cylindrical portion slidably supported from the annular support means, a downstream generally conical end portion, and an enlarged portion, the enlarged portion being intermediate the cylindrical and conical portions and forming a nozzle throat in cooperation with a convergent wall portion at the downstream end of the exhaust duct. Motor means for moving the inner plug member between a first range of positions for turbojet and ramjet operation and a second position for rocket motor operation are provided internally of the inner member. The nozzle features a load balancing arrangement for the plug member including a first seal means located on an exterior surface of the cylindrical plug portion at the extreme upstream end thereof, a second seal means located on an interior surface of the cylindrical portion in the same radial plane as the first seal means, and at least one opening or orifice in the conical downstream portion of the plug member, the first and second seal means and the opening or orifice being sized such that flow of the engine exhaust gases through the inner member during turbojet and ramjet operation is constant irrespective of the axial position of the member. In addition, the invention provides that the internal pressure in the plug is maintained at a predetermined level, also irrespective of the position of the member, to reduce to a minimum the force required for the motor means to move the plug against the aerodynamic gas loadings imposed thereon by the engine exhaust gas stream in either of said turbojet or ramjet positions.

While the appended claims are believed to distinctly point out and claim the invention, it is believed that the invention may be better understood and other objects and advantages thereof perhaps become more clear when the following detailed description is read in conjunction with the accompanying drawings in which:

FIG. 1 is a side view, partially cut away, illustrating in schematic form a combination turbo-rocket-ramjet engine with a variable annular plug nozzle having the improved load-balancing arrangement of the subject invention;

FIG. 2 is an enlarged view, partially in cross-section, of the thrust augmentation means and nozzle of the combination engine of FIGURE 1;

FIG. 4 is an enlarged, fragmentary cross-sectional view of the double leakage control seal means of the subject invention.

Figure 3:
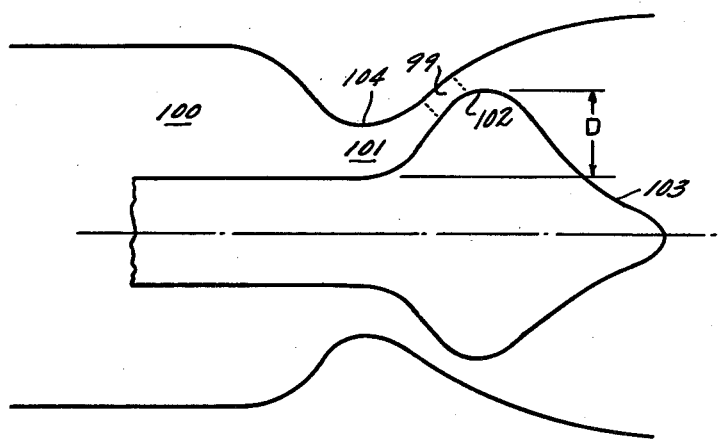
FIG. 3 is a schematic drawing of a typical known nozzle throat arrangement used for illustrative purposes.

While the plug load balancing arrangement of the present invention is disclosed in combination with a turbo-rocket-ramjet engine having thrust augmentation means, it will be understood that the improvements in the annular plug nozzle which form a principal part of this invention may find equal utility with engines of other types.

Turning now to the schematic of FIGURE 1, the combined jet propulsion powerplant illustrated therein includes a turbojet engine, a ramjet engine, and a rocket motor. Specifically, the turbojet engine includes an annular duct 10, a compressor indicated generally at 12, combustion means 14, and a power turbine 16. In the conventional manner of turbojet design, the compressor and power turbine rotors are mounted on a single shaft 18 with the combustion means 14 intermediate the compressor and turbine sections of the turbojet engine. Air enters the turbojet inlet 20, as indicated by the large arrows in the drawing, and after combustion is initiated the hot exhaust gases exit at 22 to provide thrust in the known manner. The ramjet engine, on the other hand, includes an annular by-pass duct 24 surrounding the turbojet duct and extending rearwardly of the turbojet engine proper. The annular by-pass duct in the engine shown terminates at its downstream end in a known jet nozzle configuration, indicated generally at 26, comprising a convergent wall portion 28 followed immediately by a divergent wall portion 30. The annular by-pass duct is spaced from the turbojet duct 20 by means of struts 32 and 34 with combustion supporting means in the form of fuel injectors 36 located in a chamber 40 downstream of the turbojet exhaust area 22. In the described arrangement for ramjet operation the air enters the ramjet inlet at 42, as shown by the dotted arrows in the drawings, and passes rearwardly through the annular area 44 surrounding the turbojet engine proper. Movable wall or valve means 46 are provided to convert the operation from turbojet to ramjet. Thus, in the ramjet mode, the movable wall means 46 will be in the position shown by the dotted lines in FIGURE 1, which blocks off the turbojet (rendered inoperative) duct, the movable wall means combining with an inner annular supporting means, indicated generally at 48, to form the ramjet combustion chamber 40. With the movable inner member or plug, indicated generally at 50, in the intermediate position shown in FIGURES 1 and 2, the ramjet exhaust gas will exit through an annular throat area 52 and out the extreme rear end of the divergent opening formed by the by-pass duct wall portion 30.

With the described powerplant arrangement it would also be possible to operate as a thrust augmented turbojet with the movable wall means 46 being placed in the solid line position, shown in FIGURE 1, to block off the ramjet annulus 44. In this operating mode, the hot exhaust gases exiting at 22 pass into the chamber 40 where the combustion supporting means 36 provide additional thrust by means of afterburning. The plug member 50 will preferably be in the upstream position shown in FIGURE 1. In this way the divergent area ratio of the nozzle is more closely compatible with the flight Mach number range associated with augmented turbojet operation.

The axially translatable, load balanced plug of the invention also provides for a rocket operation by means of a rocket motor configuration somewhat akin to that described in detail in the co-pending application of common assignment of Adamson et al., Serial No. 749,744, now Patent No. 3,112,612, entitled "Rocket Motor." Briefly, the rocket motor arrangement shown herein comprises a series of individual combustion chambers or cells 54 peripherally arranged about the convergent wall portion 28 of the by-pass duct, the cells opening at 56 into the area bounded by the divergent wall portion 30. In the rocket mode of operation, the turbojet and ram jet engines will both be rendered inoperative and the inner plug member 50 moved to the extreme downstream position, as shown by the dotted line location of plug wall 58 in FIGURE 2. In this manner, the individual combustion cells 54 will discharge into the annular divergent nozzle defined by wall 30 and surface 58, as shown by the small dotted arrows in FIGURE 2. This gives an area ratio suited to rocket operation at very high altitudes.

When combined with the disclosed combination turbo-rocket-ramjet engine having thrust augmentation means, it should be emphasized that the variable annular plug nozzle is capable of greatly improving the capability of the engine to operate over a wide range of flight speeds.

It should also be understood, however, that at very high flight speeds, ramjet operation employs very high combustion pressures which produce prohibitively high axially directed plug loads, on the order of 500,000 lbs. or more for typical engine diameters in known engine configurations. Obviously, a hydraulic or pneumatic actuator, and associated fluid supply system capable of moving the plug against such a force would be quite heavy, as would be the force-reacting structure. Thus, for advanced lightweight engines, the weight of the actuator and the structure to take the loads would normally be prohibitive. As mentioned above, the primary object of our invention, therefore, consists of a load balancing and pressurizing arrangement for the inner member or plug 50. In detailing the components of this arrangement, it should be explained why the location of the throat area 52 of the nozzle is critical to the concept. A typical plug arrangement used in the prior art is illustrated in FIGURE 3. Here, the throat is located at 99. In order to provide a suitable area reduction of the flow stream from the combustion region 100 to the throat, the area at 101 must be greater than the throat area 99. To achieve this, the diameter of the upstream portion of the plug must be small compared to the crown diameter at 102, which causes a large projected area—denoted by D—to be subjected to high pressures. Since the pressure of the flow decreases very rapidly downstream of the throat, there is no large pressure force on the downstream wall 103 of the plug to counteract the upstream pressure. This gives rise to the high axial forces cited above. By locating the throat at 52, as shown in FIGURES 1 and 2, there is no requirement to make the upstream cylindrical wall of the plug of such small diameter in comparison to the crown diameter since it never has to pass through the narrow portion of the outer duct wall, shown at 104 in FIGURE 3. Thus, the plug cylindrical wall diameter can be determined independently of flow considerations. The required combustion area is therefore achieved in the embodiment of FIGURE 2, by providing a suitable diameter to the outer wall 24 in the region of the nozzle plug. Since the throat 52 is located so as to occur part way down the coned portion surface 58, some portion of that surface above the throat is subjected to high pressure giving a forward pushing thrust to the plug. By suitably crowning the plug 50 at 60, a projected area A is formed, which enables an aft pushing thrust to be imposed on the plug. Suitable sizing of this crown permits a substantial balance of thrust to be achieved on the plug when combined with the internal pressurization arrangement described below. Thus, it is distinctly advantageous to locate the throat downstream of the enlarged portion 60 in the area indicated generally at 52. With such an arrangement, the inside of the plug can be maintained at some low pressure to fully achieve the load balancing.

One embodiment of the means for accomplishing this is shown in detail in FIGURES 2 and 4. The annular support member, indicated generally at 48, comprises an outer cylindrical wall 66 and an inner cylindrical wall 68 concentric therewith. The inner and outer concentric walls are joined by a radial wall 70 to form a chamber 72 adjacent the upstream end of the plug member 50. At the downstream end of the inner wall 68 is a conical member or wall 74 having at its apex a supporting pad or boss 76. Supported from the boss 76 is a motor means 78 in the form of a hydraulic or pneumatic actuator of known design. To permit axial movement of the plug 50 the cylindrical wall portion 64 of the plug is slidably supported from the inner wall 68 of the supporting means by the track and roller arrangement indicated at 80 and 82, respectively. The plug member is operably connected to the actuator 78 through a pivotable member, such as ball clevis 84 mounted on an annular pad or support 86. The support 86 has an orifice or opening 88 which permits pressurizing fluid to flow from the plug chamber 90 located between the supporting means and the plug walls 58 and 64. Vent holes 92 are provided in the forward portion of the supporting wall 68 to enable the interior 94 of the inner support structure to be connected to the chamber 72.

As shown in greater detail in FIGURE 4, first and second seal means 96 and 98, which, in this instance, are of the labyrinth variety, are provided at the extreme upstream end of the cylindrical wall 64 of the plug member. If no seal 96 (in the absence of a seal at 98) were provided the pressure in chambers 72, 90 and 94 would be equal and in thrust augmented turbojet or ramjet operation the plug would experience a high axial load due to the pressure exerted on the interior of the plug wall 58. However, if seal 96 is provided at the upstream end of the plug, high pressure gas is prevented from entering chamber 90. Internal plug pressure could then be controlled by venting the plug cavity 90 to a given lower pressure. While this arrangement would minimize the axial forces exerted on the movable plug, it would also impose a high buckling load on the wall 66 over the areas indicated generally by B and C in FIGURE 2, depending on the mode of operation, i.e., the differing positions of the plug shown by the dotted lines in the drawing. If, on the other hand, a seal means 98 (in the absence of the seal at 96) is placed between the cavity 90 and the combustion chamber 40, then additional axial force is placed on the plug member due to the increased projected area of the plug now exposed to the main burner high pressure stream. This force can be quite high even though the area increase is slight in the radial direction since it is still a relatively large area when considered as an annulus at the diameter shown in the drawing. In addition, this will needlessly expose the internal walls 70–74 to very high temperature gas. This arrangement does have the advantage, however, that the pressure in chambers 40, 72, and 94 is equalized, thus eliminating the buckling load problem with respect to wall 66 presented with use of a single seal means 96. It was therefore determined that two seal means 96 and 98 should be utilized. In this way a pressure drop is provided across the first seal 96 such that preferably the pressure in the chamber 72 is approximately half that in chamber 40. In addition, chamber 90 pressure, the reduction of which is accomplished by the drop across seal 98, is vented through a valve or an orifice, such as the orifice shown at 88, to atmosphere. Vents 92 reduce the buckling loads on the internal wall 68 and permit a much lighter force reacting support structure to be utilized.

It may therefore be stated that with the described arrangement the pressure in chamber 72 is now such as to cause only a very low additional aft thrust component on the movable plug and the pressure in chamber 90, which most effects plug load since it acts on a comparatively large area, is controlled, as stated above, by employing a valve or the orifice 88 in the vent line. This latter provision is desirable since different pressures will be required in cavity 90 to completely neutralize the thrust load on the plug depending on the particular flight operating conditions and pressures in chamber 40 by reason of the fact that the unavoidable seal leakage must be discharged in order to maintain the desired pressure level in cavity 90. In addition, the disclosed pressurization and plug load balancing arrangement minimizes the axial load due to the pressure in chambers 72 and 94. This load, which is the force reacted by the main engine support members, i.e., rear frame struts 34, is made up of the actuator force plus the pressure inside the plug times the projected area of the nozzle structure at the diameter where it is attached to the engine. This pressure should be as low as possible. Thus, while use of a single seal at 96 would have ensured lower pressure it would also have introduced the buckling problem over the areas indicated at B and C, and use of a single seal at 98, while eliminating the buckling problem, would have introduced a high axial load on the plug member and engine frame. Discovery of the double seal concept, therefore, permitted a compromise in the extremes of pressure and loads on the plug, while reducing the forces on the supporting structure to a desirable minimum. In addition, contrary to the previous known movable plug arrangements for high-Mach engines, the nozzle throat is so located as to be closed through rearward translation of the plug. This is clearly advantageous due to the normal operating pressures being in that direction in advanced engines of the type shown having thrust augmentation means. This further reduces the average net force needed to move the plug to desired operating position. In combination with the double seal pressurization arrangement, this permits the actual operating loads on the movable parts to be in virtual balance under average operating conditions. In other words, sizing the discharge orifice 88 so that the resulting pressure inside the plug (chamber 90) produces a rearward force opposite and nearly equal to the forward plug force due to pressure distribution outside the plug minimizes the actuation force requirement. In essence, the plug force requirement can be made to vary in equal amounts on either side of a null point over the range of normal engine operating conditions. Finally, it should be noted that the pressure balancing flow over the labyrinth seals 96 and 98 to the plug interior occurs at all plug positions and during all operating modes and, further, the plug pressure never changes during axial motion of the plug since the seals and vent orifice can be sized to control the plug pressure. Thus, it should be clear that the plug pressure serves only to limit the force required to move the plug and does not of itself accomplish actuation.

What we claim is:

1. In an annular variable throat plug nozzle for use with a turbo-ramjet engine having an exhaust gas duct:
   convergent-divergent wall means located at the downstream end of the exhaust duct;
   an annular support member fixed within said exhaust duct upstream of the convergent wall means, said support member having an outer wall spaced from said duct and an inner wall;
   a hollow, annular plug member, said plug member having an upstream portion adapted to be slidably supported between said outer and inner walls and a crowned portion intermediate the ends of the plug member, said crowned portion forming a nozzle throat area on the downstream side thereof in cooperation with the convergent portion of said convergent-divergent wall means;
   means for axially translating said plug member to achieve throat area variation for turbojet or ramjet operation;
   and means for regulating the internal pressure of said hollow plug member during turbojet or ramjet operation including a plurality of sealing members mounted on said plug member at the upstream end thereof, said sealing members cooperating with said outer and inner walls to cause a pressure differential to exist between the exhaust gas stream and the plug interior, and an orifice for venting said plug interior to control said pressure differential, said controlled pressure differential and a forward thrust component just upstream of the nozzle throat combining to reduce to a minimum the force required to move said plug member against the aerodynamic loads imposed thereon by the exhaust gases during turbojet or ramjet operation.

2. In an annular variable throat plug nozzle for use with a turbo-ramjet engine having an exhaust gas duct;
   convergent-divergent wall means located at the downstream end of the exhaust duct;
   an annular support member coaxially fixed within said exhaust duct, said support member having an outer wall and an inner wall;

a hollow, annular plug member, said plug member having an upstream portion slidably mounted on said inner wall, a conical downstream portion, and a crowned portion intermediate said upstream and downstream portions, said crowned portion forming a nozzle throat area in cooperation with the convergent portion of said convergent-divergent wall means, said throat area being on the downstream side of said crowned portion in order that a forward thrust component is imposed thereon during engine operation;

motor means fixed within said duct and operably connected to said plug member for axially translation thereof for throat area variation depending on the requirements of turbojet or ramjet operation;

and means for regulating internal pressure within said hollow plug member during engine operation including first labyrinth sealing means on an exterior surface of said plug member upstream portion, second labyrinth sealing means on an interior surface of said upstream portion, said first and second sealing means cooperating with said outer and inner support member walls, respectively, to cause a pressure differential to exist between the engine jet exhaust gas stream and the interior of the plug member, and a plug member orifice downstream of said sealing means, said orifice controlling said pressure differential in all operating positions of said plug member, said controlled pressure differential and said forward thrust component combining to reduce to a minimum the force required to move said plug member against the aerodynamic loads imposed thereon by the exhaust gases during turbojet or ramjet operation.

3. Thrust augmentation means for use with a turbo-rocket-ramjet engine including an outer exhaust duct terminating downstream in convergent-divergent wall means and a plurality of combustion cells arranged about said convergent portion and being adapted to discharge into the area bounded by said divergent portion, said thrust augmentation means comprising:

an annular support member coaxially fixed within said exhaust duct, said support member having an outer wall and an inner wall;

movable wall means cooperating with said outer wall and said exhaust duct to form a combustion chamber;

means for initiating combusion in said chamber;

a hollow annular plug member, said member being slidably mounted on said support member and including a crowned portion forming an exhaust nozzle throat area, said throat area being located on the downstream side of said crowned portion;

means for axially translating said plug member over a range of operating upstream positions for throat variation during turbojet and ramjet operation, the plug member being movable to an extreme downstream position for rocket operation;

and means for regulating the internal pressure of said hollow plug member during turbojet or ramjet operation including a plurality of sealing members mounted on said plug member at the upstream end thereof, said sealing members cooperating with said outer and inner walls to cause a pressure differential to exist between said chamber and said plug interior, and an orifice for venting said plug interior to control said pressure differential, said controlled pressure differential and a forward thrust component just upstream of the nozzle throat combining to reduce to a minimum the force required to move said plug member against the aerodynamic loads imposed thereon by the exhaust gases during turbojet or ramjet operation.

4. In thrust augmentation means for a turbo-ramjet engine having an outer exhaust gas duct terminating in a convergent-divergent wall portion:

an annular support member coaxially fixed within the exhaust duct, said support member having an outer wall and an inner wall spaced therefrom and extending partially downstream thereof;

a hollow, annular plug member slidably mounted on said support member and including a crowned portion forming a nozzle throat area with said convergent duct wall portion, said throat area being on the downstream side of said crowned portion;

motor means for moving said plug member axially of said support member throughout a range of positions for nozzle throat area variation dependent on the requirements of turbojet or ramjet operation;

an internal pressure regulating means for said hollow plug member including first seal means located exteriorly of the upstream end of the plug member, second seal means located interiorly of said upstream end, and an orifice for venting fluid flow through said seal means from the interior of said hollow plug member, said fluid flow into the plug member interior and out through said orifice being constant irrespective of throat area variation, and wherein a controlled pressure drop across said seal means and said orifice cooperates with a forward throat component imposed on the downstream side of said crowned portion to minimize the force required to move said plug member against the loads imposed thereon by the exhaust gas stream in said operating positions.

5. In jet propulsion powerplant:

a turbojet engine, said turbojet engine including an annular duct, a compressor, combusion means, and a turbine all coaxially arranged for series flow therethrough in the order named;

a ramjet engine, said ramjet engine including an annular by-pass duct disposed about the turbojet duct, an annular wall coaxially spaced within said by-pass duct and located immediately downstream of said turbine, movable wall means cooperating with said annular wall to form a combustion chamber in combination with said by-pass duct, and means for initiating combustion located in said chamber;

annular support member wall means, said wall means including a cylindrical portion fixed within said annular ramjet engine wall;

a hollow annular plug member, said plug member including an upstream cylindrical portion slidably supported from said wall means, a generally conical downstream portion, and a crowned portion intermediate said upstream and downstream portions and forming a throat area in the nozzle in cooperation with a convergent portion of the by-pass duct, said throat area being located on the downstream side of said crowned portion;

motor means fixed within said plug member, said motor means moving said plug member axially with respect to said wall means over a range of upstream positions for turbojet or ramjet operation, and a second extreme downstream position for rocket operation wherein said crowned portion abuts said convergent portion of the by-pass duct for sealing thereof;

a pressure regulating system for said hollow annular plug member, said system including first seal means located on an exterior surface of said cylindrical portion at the upstream end thereof, a second seal means located on an interior surface of said cylindrical portion in the same radial plane of said member as said first seal means, and at least one orifice in said generally conical portion, wherein flow of combustible fluid over said seals and through said plug member orifice during operation is constant irrespective of the axial position of the plug member so that the internal pressure of said member is maintained at a predetermined level below that of said fluid, said pressure level in combination with forward thrust exerted on the downstream side of said crown by the exhaust gases being such as to reduce to a minimum the force required to move said plug member against the aerodynamic loads imposed thereon by said exhaust gases in said range of operating positions;

and a series of combustion cells peripherally arranged about the downstream end of said by-pass duct and having propellant-supplying means connected thereto, said cells opening into the area bounded by the downstream end of said by-pass duct and forming a rocket motor in combination with said plug member when said member is in an extreme downstream position.

References Cited by the Examiner

UNITED STATES PATENTS

| | | | |
|---|---|---|---|
| 2,483,401 | 10/49 | Cole | 60—35.6 |
| 2,570,629 | 10/51 | Anxionnaz et al. | 60—35.6 |
| 2,811,827 | 11/57 | Kress. | |
| 2,970,431 | 2/61 | Harshman | 60—35.6 X |
| 2,995,893 | 8/61 | Morris et al. | 60—35.6 |
| 3,048,974 | 8/62 | Bertin et al. | 60—35.6 X |

FOREIGN PATENTS 885,489 12/61 Great Britain.

SAMUEL LEVINE, *Primary Examiner.*

ABRAM BLUM, *Examiner.*